United States Patent

Gallery et al.

[19]

[11] Patent Number: 5,991,443
[45] Date of Patent: Nov. 23, 1999

[54] GRAPHICS IMAGE MANIPULATION

[75] Inventors: Richard D. Gallery, Monley; Octavius J. Morris, Hazelhurst Cottage; Edward S. Eilley, Reigate; David E. Penna, Redhill, all of United Kingdom

[73] Assignee: U.S. Philips Corporation, New York, N.Y.

[21] Appl. No.: 08/721,916

[22] Filed: Sep. 27, 1996

[30] Foreign Application Priority Data

Sep. 29, 1995 [GB] United Kingdom ............ 9519921

[51] Int. Cl.$^6$ ........................................... G06K 9/36
[52] U.S. Cl. .......................... 382/232; 382/236; 382/238
[58] Field of Search .................................. 382/232, 236, 382/238; 395/200.34; 348/396, 17; 358/404, 530, 524, 539; 345/428, 433

[56] References Cited

U.S. PATENT DOCUMENTS

| | | | |
|---|---|---|---|
| 5,241,401 | 8/1993 | Fujiwara et al. | 358/404 |
| 5,265,180 | 11/1993 | Golin | 382/236 |
| 5,333,012 | 7/1994 | Singhal et al. | 382/236 |
| 5,535,288 | 7/1996 | Chen et al. | 382/236 |
| 5,570,133 | 10/1996 | Yagasaki | 382/236 |
| 5,627,581 | 5/1997 | Kondo | 348/17 |
| 5,644,660 | 7/1997 | Bruder | 382/236 |
| 5,703,966 | 12/1997 | Astle | 382/238 |

OTHER PUBLICATIONS

Computer Graphics: Principles and Practice pp. 680–686, James D. Foley et al, Addison–Wesley Publishing Co. Ltd. 1990.

*Primary Examiner*—Jose L. Couso
*Assistant Examiner*—Anh Hong Do
*Attorney, Agent, or Firm*—Laurie E. Gathman

[57] ABSTRACT

In an image source for multimedia applications such as networked computer games, a graphics engine (16) generates pixel images one line at a time using a scan-line algorithm and supplies the generated scan lines to an encoder (18) where they are buffered. The encoder codes the buffered pixel data as macroblocks of, for example 16×16 pixels according to MPEG or similar standards. When the graphics engine has sent sufficient scan lines for a first macroblock to the encoder, it sends a signal (FLAG) on receipt of which the encoder begins coding the pixel data as a macroblock in a line of macroblocks whilst continuing to receive scan lines from the graphics engine (16). To increase encoder efficiency, the graphics engine specifies to the encoder global (GMV) and macroblock (BMV) motion vectors for substantially all or selected ones of the macroblocks of an image respectively. Completed coded macroblock lines may be sent to a remote user over a data network, with user commands for modifing the composition of subsequent image frames being received on a back-channel (26) of the network.

16 Claims, 3 Drawing Sheets

GRAPHICS IMAGE MANIPULATION

BACKGROUND OF THE INVENTION

The present invention relates to the manipulation and coding of video images and particularly, but not exclusively, to the interactive manipulation and predictive coding of computer graphics images for transmission over a network to one or more remote users.

A particular problem with real time image manipulation in multimedia applications such as a network system, where user commands are sent over the network from a terminal to a remote server and images modified in response to those commands are sent back over the network to the user, is the round trip loop delay.

In current MPEG systems the minimum delay in a decoder is around 80 ms (40 ms minimum buffer delay and around 40 ms decoding time) and operation at this extreme produces low quality pictures, assuming a network interface transfer rate of around 1.5 Mb/s. With higher speeds the quality may be restored or the latency may be reduced, by reducing the buffer delay, but the higher speed capability would produce penalties in terms of the cost and complexity of the equipment required. The commensurate figure for the encoder is around 60 ms, of which around 20 ms is the time to grab one field and 40 ms is the encoding time. Again, at this extreme, the quality would be poor. The delay attributable to the network back channel, passing control messages from user to server, is about 15 ms, typically. Given standard MPEG operation, with 1.5 Mb/s digital video transmission rate and accepting minimal quality presentation, the minimum round trip delay in a remote game, or any other networked Video-on-Demand (VoD) type of application, is about 160 ms.

Typical human reaction time is of the order of 80 ms, and a system (whether communicating over a network or directly connected) that responds more slowly than this will appear sluggish to a user. Whilst, in some applications, the remote user can become accustomed to the delay due to system latency and compensate for it, applications requiring rapid user reaction will inevitably suffer. As an example in terms of directly connected systems, the U.S. Federal Aviation Authority has a limit of 150 ms permitted latency in commercial flight simulators.

SUMMARY OF THE INVENTION

It is, therefore an object of the present invention to reduce latency in image manipulation systems, particularly where these are incorporated in interactive networked applications.

It is a further object to reduce picture degradation which might otherwise arise due to latency minimisation.

In accordance with the present invention there is provided encoded image generation apparatus comprising a graphics image generator operable to generate successive frames of pixel images and an encoder coupled thereto and arranged to encode each generated image frame as a series of macroblocks of pixel data, each macroblock being m pixels wide by n pixels high, where m and n are integers; characterised in that the graphics image generator is configured to generate each image frame as successive areas of pixels, to pass the pixel data for said areas to the encoder and to send a control signal to the encoder as soon as pixel data for n lines of an image frame have been passed, and the encoder is configured to receive and buffer said pixel data and, on receipt of the control signal, to begin to encode a line of macroblocks of the buffered pixel data. By beginning the encoding process whilst the graphics image generator (graphics engine) is still assembling the frame, the generator/encoder contribution to the system latency is greatly reduced.

To allow for interactive image manipulation, an input is preferably provided for user control signals, in response to which signals the graphics image generator changes at least a part of an image in a first frame in one or more successive further image frames.

Also in accordance with the present invention there is provided a video signal distribution system comprised of a video server together with one or more user terminals connected thereto by a data transmission network, wherein the or each of said user terminals comprises a decoder and display device operable to display the generated pixel images, and user input means operable to generate and send said user signals, to said video server, said video server comprising:

a graphics image generator operable to generate and output data defining a pixel image frame as successive areas of pixels, and configured to output a control signal as soon as pixel data for n lines of a macroblock of said image frame have been output;

an encoder coupled to receive and buffer said pixel data and to receive said control signal from said graphics image generator, and in response thereto to begin encoding said pixel data as a series of macroblocks of pixel data, each of said macroblocks being m pixels wide by n pixels high, where m and n are integers, and to output said encoded pixel data to said one or more user terminals via said data transmission network; and an input coupled to receive said user signals from said data transmission network and to supply them to said graphics image generator; wherein said graphics image generator is arranged to change at least a part of an image in a given image frame in one or more successive further image frames, and said encoder is configured to begin to encode a series of macroblocks of said buffered pixel data on receipt of said control signal.

The image may be generated as successive blocks or areas of pixel data, with the encoder being triggered as soon as it has been sent enough data to cover a n lines of the macroblock row. Alternately, the graphics image generator may be configured to generate an image frame as successive lines of pixel data, to pass said lines to the encoder and to send a control signal to the encoder every n lines, with the encoder being configured to receive and buffer said lines and, on receipt of the control signal, to encode the buffered lines of pixel data as a macroblock in a line of macroblocks.

Suitably, the graphics image generator implements a scan line algorithm in the generation of lines of pixel data, with the generator including a memory for image primitives and means for determining, and storing a list of, those primitives active for a given pixel line. Scan line algorithms are a known technique described, for example, in "Computer Graphics: Principles and Practice" at pp 680–686 by James D Foley et al, second edition, pub. Addison-Wesley Publishing Co Ltd, 1990, ISBN 0-201-12110-7. Their particular application to the present invention is described in greater detail and with reference to exemplary embodiments hereinafter.

Preferably, the encoder is arranged to code the macroblocks of pixel data in terms of a motion vector, performing a comparison search with respect to a current macroblock and the preceding image frame to determine a motion vector for the current macroblock. To enhance the efficiency of the encoder operation and improve image quality, the graphics image generator may specify to the encoder a global motion vector for an image, with the encoder beginning the comparison search for each macroblock of that image from the global motion vector. Furthermore, taking advantage of the relatively simple nature of the graphical images, the graphics image generator may specify to the encoder a block motion vector for one or a group of macroblocks of an image, with the encoder beginning the comparison search for an identified macroblock, or each of the group of macroblocks, from the block motion vector.

BRIEF DESCRIPTION OF THE DRAWING

Preferred embodiments of the present invention will now be described in terms of the MPEG system by way of example only and with reference to the accompanying drawings in which.

DESCRIPTION OF THE PREFERRED EMBODIMENTS

In the following, the invention will be described principally in terms of the MPEG 1 coding scheme as defined in ISO 11172, although it will be recognised that it is applicable to other coding schemes, particularly hybrid-DCT (discrete cosine transformation) based coding schemes, such as the H.261 standard for video-telephony. MPEG and H.261 are digital coding systems conventionally used for storing and compressing natural picture sequences, with the decoders being designed to interpret such encoded data and reproduce the same original sequence of images.

Figure 1:
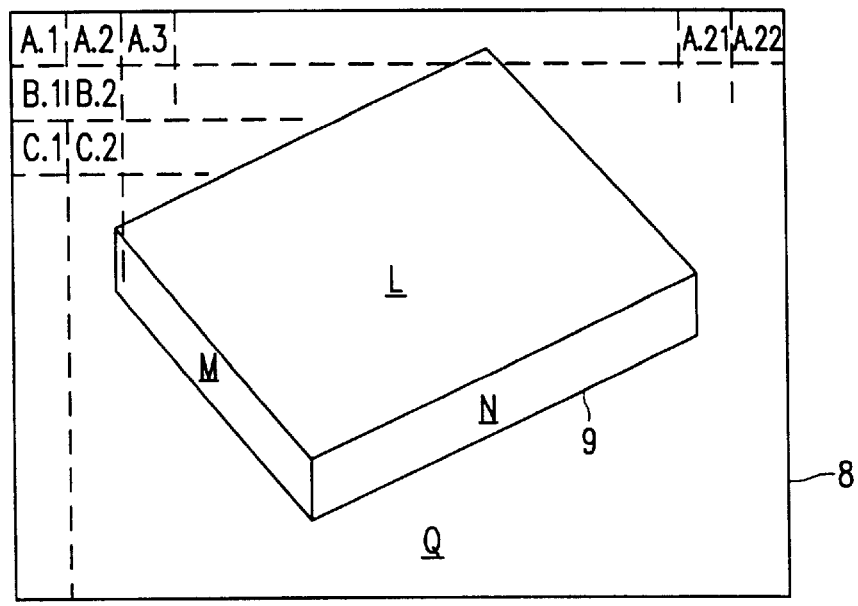
FIG. 1 represents a pixel image frame divided into macroblocks.

The MPEG system defines a grid of macroblocks as shown in FIG. 1 where the image frame 8 is a droplay of a rectangular block 9 formed of image primitives L, M and N against a background Q. As will be understood, primitives L, M and N may each be made up of two or more primitives; for example each of the parallelograms may be formed from a pair of similar-triangle primitives. Each macroblock A1,A2,B1,B2 etc of the image frame 8 consists of 16 pixels on each of 16 successive lines; these macroblocks are the basic unit of MPEG coding. Three main coded picture types are defined in MPEG, namely intra-pictures, predicted pictures and interpolated pictures; these are generally referred to as I-, P- and B-frames respectively.

Within a picture type, a macroblock may be coded in one of a number of different ways: two basic macroblock coding modes from the MPEG standard are the "intra mode" and the "motion compensated, not coded modes". In the intra mode, the address of the macroblock describes which macroblock is represented, followed by the macroblock type, and the DCT coefficient data for the pixel values. In the motion compensated mode, the information following the address and type information is a motion vector for the macroblock. The motion vector provides a displacement from the address of the current macroblock in the current picture to a pixel and line address on the previous picture from where it is copied to the current picture. Intra coded macroblocks may be used in predicted pictures to introduce image blocks that are not present in the previous frame.

Figure 2:
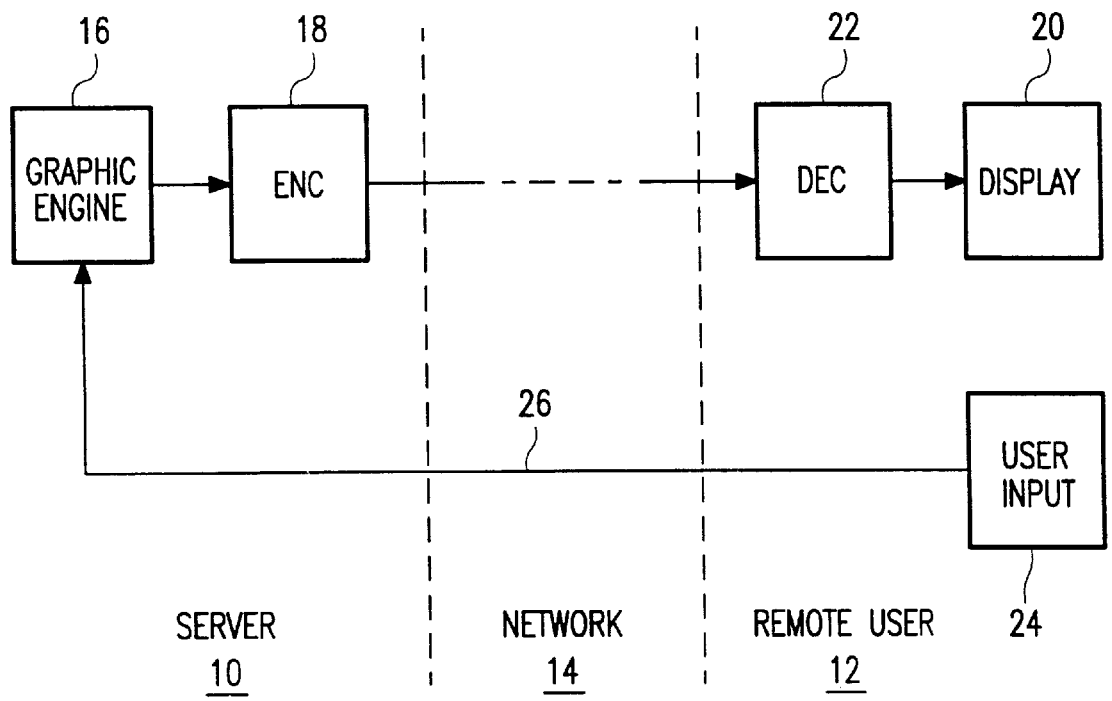
FIG. 2 is a block schematic diagram of a server and remote terminal connected over a data network.

A typical system arrangement for networked video applications consists of a server 10 and one or more remote users 12 communicating with the server over a network 14, as shown in FIG. 2. Graphic images are generated by graphics engine 16 at the server site and these images are passed to an MPEG encoder 18 which codes the images for transmission over the network. At the remote user site 12, the user is provided with at least a display 20 (with associated MPEG decoder 22) and an interactive control 24 by use of which user command signals affecting the displayed image may be sent to the server 10 via a back channel 26 of the network. A possible arrangement for the remote user, for example in a home environment and depending on the networked application, would be a personal computer interfaced to the network and with an MPEG capability.

Figure 3:
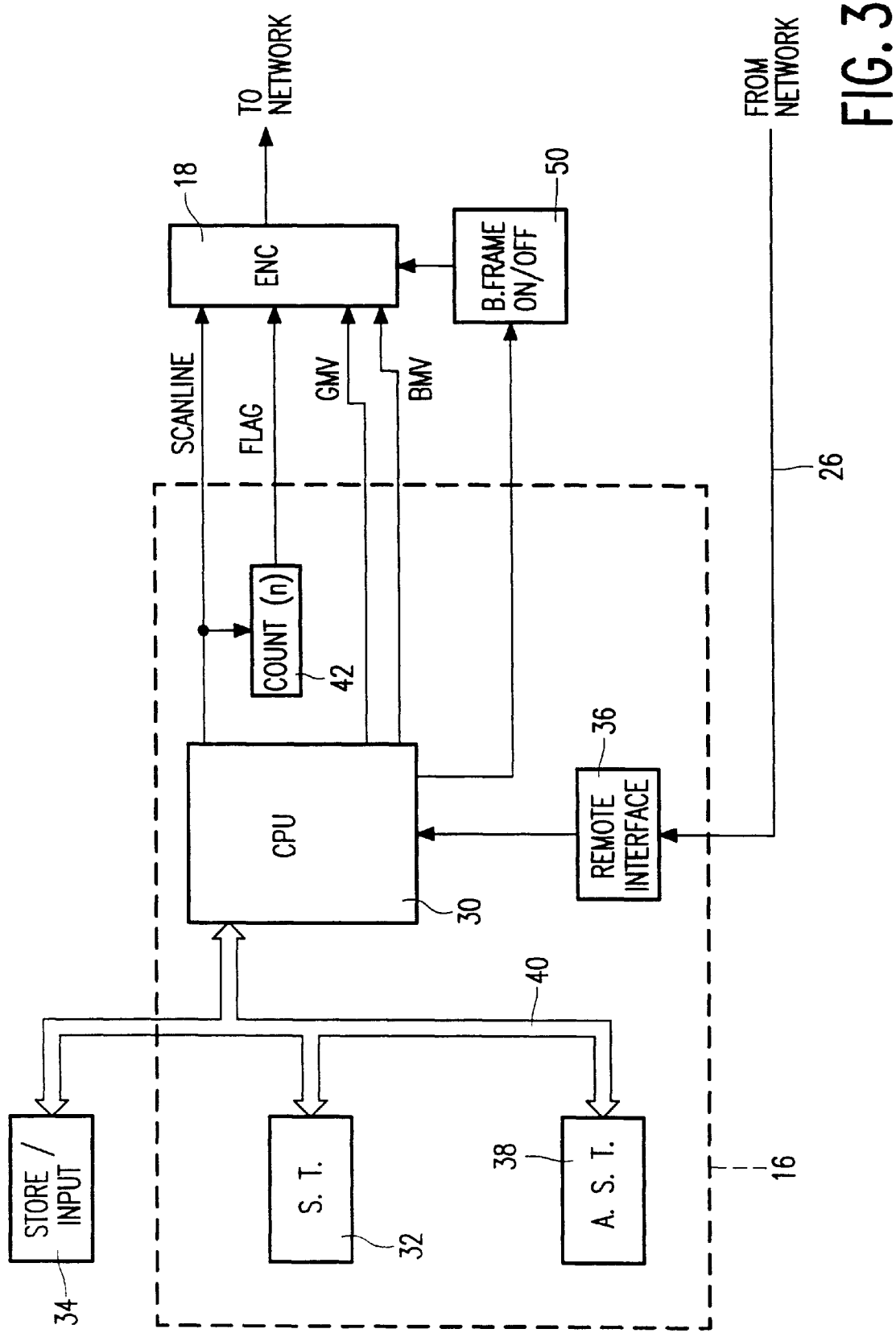
FIG. 3 shows the network server of FIG. 1 in greater detail.

FIG. 3 shows the server in greater detail. The graphics engine 16 includes a processor 30 which assembles images one line at a time by use of a scan line algorithm (to be described below) from surface data stored in a surface table (ST) memory 32 and an active surface table memory (AST) 38 coupled to the processor via data bus 40. The surface data comprises geometrical shapes (primitives) from which an image is assembled in known manner together with information as to surface detail (texture, colouring, reflectance etc). The surface table memory 32 holds surface data for all primitives of an image; the active surface table memory 38 holds data for only those primitives appearing in a given line of the image.

The commands from the remote user on back channel 26 are passed to the processor 30 via a suitable interface 36, which commands require changes to the displayed image. Such changes may include movement of a particular displayed object (sprite) about the screen, or scrolling of a larger image. The processor acts on these commands by updating the surface data memory 32 from a mass storage memory 34 or external source of possible shapes such that memory 32 contains data for each of the surfaces to be assembled to form the complete image.

As will be appreciated, where more than one user is connected to the server, some arrangement will be required at the interface 36 for controlling access and/or priority setting of user commands.

Figure 4:
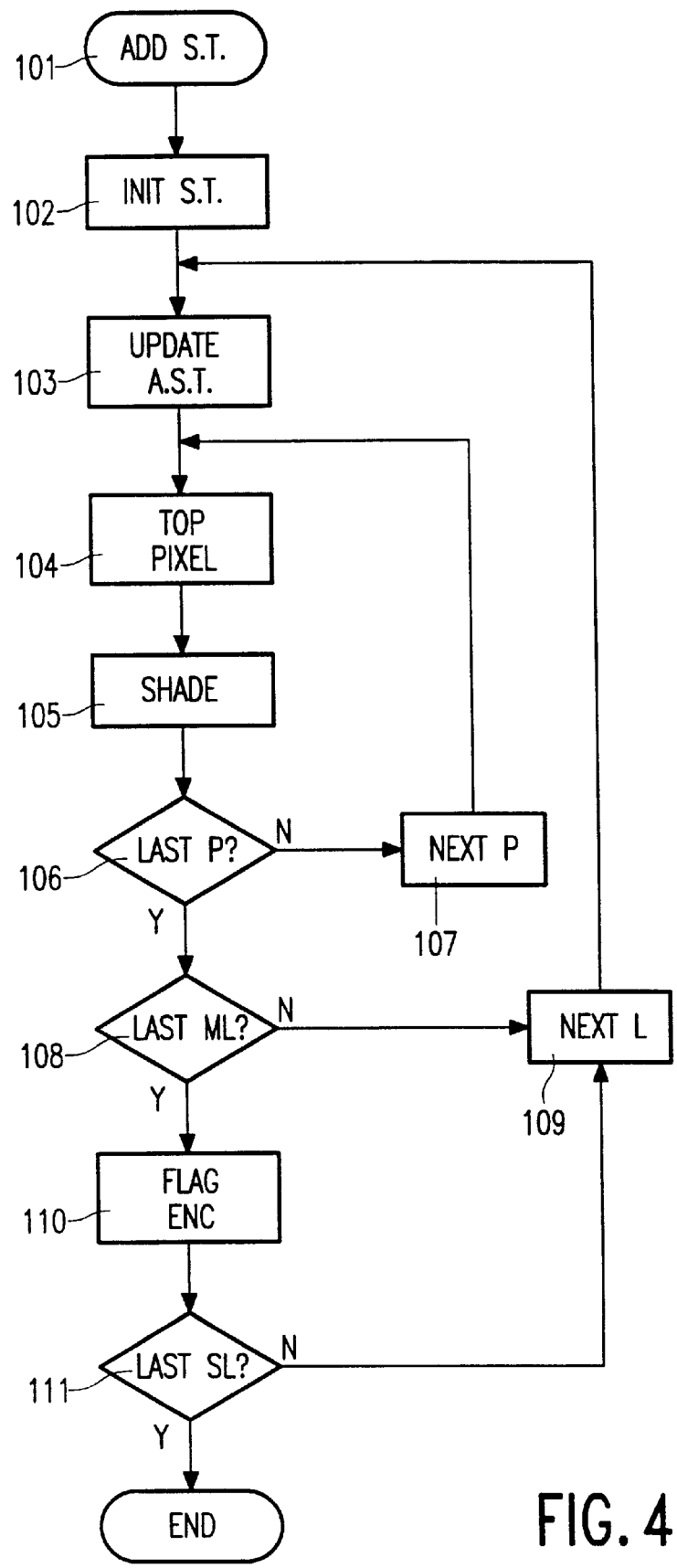
FIG. 4 is a flow chart representing the application of a scan line algorithm in the server of FIG. 3.

The implementation of the scan line algorithm by the graphics engine 16 to generate an image frame is shown in flow chart of FIG. 4. The process begins at step 101 (ADD S.T) with the surfaces (image primitives) needed to form the image frame being loaded from external input or storage to the surface table memory 32. Following this, the next step 102 (INIT A.S.T) is to initialise the active surface table memory 38, loading it from surface table memory 32 with those surfaces which contribute to the first pixel line of the image. For the first line, the following step, 103 (UPDATE A.S.T) is skipped, and the process enters a per-pixel loop 104–107.

At step 104 (TOP PIXEL), the per-pixel contribution from two or more overlapping surfaces is determined. Where, for example, the image is of a three-dimensional object mapped onto two-dimensional screen space, conventional depth buffering and/or hidden surface removal techniques may be employed to determine the extent to which each surface contributes to the pixel. Where surface effects such as transparency or partial opacity are provided for, this step may determine a ratio in which each surface contributes to the pixel. At step 105 (SHADE), the pixel colour and/or texture is calculated with reference to the active surface table 38 and the surface(s) contributing at step 104. Step 106

(END P?) determines whether the pixel is a the end of a line and, if not, the next pixel is selected at step 107 (NEXT P) and the procedure reverts to step 104.

If step 106 determines that the last pixel of a line has been reached, the procedure moves to step 108 (LAST ML?) where a line count check is made to see if the number of lines generated is an integer multiple of n, where n is the number of lines per macroblock (16 lines in the case of MPEG). If this step indicates that the current line is not the last of a macroblock, the procedure moves to step 109 (NEXT L) where the next line is selected and then back to step 103 (UPDATE A.S.T) where the active surface table is updated to contain the surface information for those surfaces which contribute to the next line.

If step 108 determines that the current line is the last one of a macroblock, then at step 110 (FLAG ENC) a control signal (FLAG; FIG. 3) is sent to the encoder 18 indicating that the encoder now has a complete macroblock line which may be encoded. Assuming that the image is an integer number of macroblocks high, such that the last screen pixel line will also be the last line contributing to a macroblock line, the procedure then moves to step 111 (LAST SL?) where a check is made as to whether the current line is the last of an image frame. If so, the procedure ends or reverts to step 101 for the start of a new image frame: if not, the next line is selected at step 109 and the procedure reverts to step 103.

Returning to FIG. 3, the scan line pixel data from the processor 30 is passed to the encoder stage 18 where it is accumulated in a buffer (not shown). A counter 42 (shown separate from the processor 30 although it may be a part thereof) counts the number of scan lines sent, and at every nth scan line (where n is the number of lines in a macroblock) it sends the FLAG signal (the macroblock line command) to the encoder. On receipt of this FLAG signal the encoder reads the accumulated scan lines from its buffer and begins to encode them as a line of macroblocks. With reference to FIG. 1, this means that the encoder will start coding macroblock line A1, A2, . . . A22 as soon as it has received the 16th line of pixel data from macroblock a1.

With the data being encoded as the frame is assembled, the normal delay is reduced, although the complete MPEG standard cannot be implemented due to the absence of the following frame. In other words, the encoder stage 18 can generate only I- and P-frames: B-frames, coded in MPEG with respect to both the preceding and following frames, cannot be produced. Although the MPEG standard does permit signal coding with I- and P-frames only, this can lead to a reduction in picture quality. In order to minimize such a reduction in quality, use is made of the relatively simple nature of motion vectors in graphics applications to provide assistance to the encoder such as to improve its efficiency of operation.

In graphics under the control of a user, the whole or a large part of the image may be required to move together. The global motion vector of the image to be encoded (corresponding to panning of a "virtual camera") is therefore known in the graphics engine 16 where it is used as an input to the graphical calculations. As shown in FIG. 3, this global motion vector is provided as an additional input (GMV) to the encoder stage 18 where it provides assistance to the motion vector search pattern during motion compensation of macroblocks, by specifying a "most likely" direction for starting the search pattern.

Due to the relatively simple nature of the graphics image, in comparison with, for example, a still from a video camera, it is possible to analyse the graphics image at an object level, that is to say in terms of features formed from one or more surfaces whose appearance does not change from one frame to the next but whose location within the image may change. In the processor such objects or portions of objects may be identified with one or more macroblocks of a current and a previous frame. Motion vectors for such macroblocks are passed to the encoder stage 18 as a further input (BMV) for use by the encoder as a guide to the motion vector search applied when coding those macroblocks. The result of this is an improvement in the image quality.

To further enhance the functionality of the system as a whole, provision is made for switching to conventional MPEG encoder operation, through B-frame on/off toggle 50; under user or application control via the processor 30. This enables conventional encoding, with I-, P- and B-frames, where real time responsiveness to user input is not required, for example when playing back a sequence of frames without enabling user interaction.

From reading the present disclosure, other modifications will be apparent to persons skilled in the art. Such modifications may involve other features which are already known in the design, manufacture and use of interactive image coding equipment and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

We claim:

1. Encoded image generation apparatus comprising:

a graphics image generator operable to generate pixel image frames:
   and an encoder coupled to the graphics, image generator and arranged to encode each generated image frame as a series of macroblocks of pixel data, each of said macroblocks being m pixels wide by n pixels high, where m and n are integers; and
   wherein said graphics image generator is configured to generate an image frame as successive areas of pixels, to pass pixel data for said areas to said encoder, and to send a control signal to said encoder as soon as pixel data for n lines of a macroblock have been passed; and
   said encoder is configured to receive and buffer said pixel data and, on receipt of said control signal, to begin to encode a macroblock in a line of macroblocks of said buffered pixel data.

2. Apparatus as claimed in claim 1, wherein said graphics image generator is configured to generate an image frame as successive lines of pixel data, to pass said lines to said encoder, and to send said control signal to said encoder every n lines; and said encoder is configured to receive and buffer said lines and, on receipt of said control signal, to encode said buffered lines of pixel data as a macroblock in a line of macroblocks.

3. Apparatus as claimed in claim 2, wherein said graphics image generator implements a scan line algorithm in the generation of said lines of pixel data, said graphics image generator including a memory holding data defining image primitives and means for determining, and storing a list of, those of said image primitives which are active for a given pixel line.

4. Apparatus as claimed in claim 1, wherein said encoder is arranged to code said macroblocks of pixel data in terms of a motion vector, and to perform a comparison search with respect to a current macroblock and the preceding image frame to determine a motion vector for a current macroblock.

5. Apparatus as claimed in claim 4, wherein said graphics image generator is arranged to output to said encoder a global motion vector for an image frame and said encoder begins said comparison search for each macroblock of that image frame from said global motion vector.

6. Apparatus as claimed in claim 4, wherein said graphics image generator is arranged to output to said encoder a block motion vector for an identified one or a group of macroblocks of an image, and said encoder begins said comparison search for that identified macroblock, or each of said group of macroblocks, from said block motion vector.

7. Apparatus as claimed in claim 1, further comprising an input for user command signals, in response to which command signals said graphics image generator changes at least a part of an image in a given image frame in one or more successive further image frames.

8. Apparatus as claimed in claim 1, wherein said encoder is operable to encode said generated images as I-frames or P-frames according to MPEG standards.

9. A video signal distribution system comprised of a video server together with one or more user terminals connected thereto by a data transmission network, wherein the or each of said user terminals comprises a decoder and display device operable to display generated pixel images, and user input means operable to generate and send user command signals to said video server, said video server comprising:

a graphics image generator operable to generate and output data defining pixel images as successive areas of pixels and configured to output a control signal as soon as pixel data for n lines of a macroblock of an image have been output;

an encoder coupled to receive and buffer said pixel data and to receive said control signal from said graphics image generator, and being arranged to encode said pixel data as a series of macroblocks of pixel data, each of said macroblocks being m pixels wide by n pixels high, where m and n are integers, and to output said encoded pixel data to said one or more user terminals via said data transmission network; and an input coupled to receive said user command signals from said data transmission network and arranged to supply them to said graphics image generator; wherein said graphics image generator is arranged to change at least a part of an image in a given image frame in one or more successive further image frames, and said encoder is configured to begin to encode a macroblock in a line of macroblocks of said buffered pixel data on receipt of said control signal.

10. A system as claimed in claim 9, wherein said graphics image generator is configured to generate images as successive lines of pixel data, to pass said lines to said encode, and to send said control signal to said encoder every n lines; and said encoder is configured to receive and buffer said lines and, on receipt of said control signal, to begin to encode said buffered lines of pixel data as a macroblock in a line of macroblocks.

11. A system as claimed in claim 10, wherein said graphics image generator implements a scan line algorithm in the generation of said lines of pixel data, said graphics image generator including a memory holding data defining image primitives and means for determining, and storing a list of, those of said image primitives which are active for a given pixel line.

12. A system as claimed in claim 9, wherein said encoder is arranged to code said macroblocks of pixel data in terms of a motion vector, and to perform a comparison search with respect to a current macroblock and the preceding image frame to determine a motion vector for a current macroblock.

13. A system as claimed in claim 12, wherein said graphics image generator is arranged to output to said encoder a global motion vector for an image and said encoder begins said comparison search for each macroblock of that image from said global motion vector.

14. A system as claimed in claim 12, wherein said graphics image generator is arranged to output to said encoder a block motion vector for an identified one or a group of macroblocks of an image, and said encoder begins said comparison search for that identified macroblock, or each of said group of macroblocks, from said block motion vector.

15. A system as claimed in claim 9, further comprising an input for user command signals, in response to which signals said graphics image generator changes at least a part of an image in a given image frame in one or more successive further image frames.

16. A system as claimed in claim 9, wherein said encoder is operable to encode said generated images as I-frames or P-frames according to MPEG standards.

* * * * *